March 12, 1968 H. THIELE ET AL 3,372,789

KEYBOARD WITH IMMOBILE TOUCH SWITCHES

Filed Dec. 15, 1966

3,372,789
KEYBOARD WITH IMMOBILE TOUCH SWITCHES

Heinz Thiele, Leinfelden, near Stuttgart, and Gerhard Borner, Musberg, near Stuttgart, Germany, assignors to Zeiss Ikon Aktiengesellschaft, Stuttgart, Germany, a corporation of Germany Filed Dec. 15, 1966, Ser. No. 602,008
Claims priority, application Germany, Jan. 29, 1966, Z 12,007
6 Claims. (Cl. 197—98)

ABSTRACT OF THE DISCLOSURE

A keyboard comprising a transparent plate is provided with immobile touch switches consisting of concave touch cavities, each of which is associated with a light barrier means including a photoelectric transducer embedded in the plate which is adapted to be energized by a light beam transmitted by the plate across said cavity. This light beam is interrupted by a finger of the operator when it enters and touches the concave surface of the cavity, thereby producing an electric control impulse which is used in known manner to operate a control device or the like.

The invention relates to a keyboard with immobile touch switches. It is known that such boards are equipped with capacitive keys or switches which need only be touched to release a control impulse, but need not be moved mechanically. This entails in addition to convenience of operation the further advantage that no mechanically operated contacts with their known shortcomings are used.

Some devices of this type operate on heated vacuum tubes. They take up relatively much space, heat up due to electric current consumption even when in an inoperative position and are elaborate and costly in their set-up and maintenance. Furthermore, the necessary circuits mostly do not comply with the high frequency law because of their high frequency interference radiation.

Improvements to avoid this interference radiation and to increase the stability also increase the cost and structural set-up by the use of extensive electronic tube circuits which in turn are subject to numerous weaknesses.

Other circuits which employ semi-conductors and which avoid the disadvantages of electronic tube circuits are rather complicated when the stability required for actual service is to be attained.

It is the object of the invention to produce a keyboard with immobile touch switches whose construction and arrangement are very simple and whose operation is safe and not susceptible to the influence of interference impulses.

Further, such a keyboard is to provide a touch contact with the individual touch cavities to also allow a blind operation without triggering undesired interference impulses.

These problems underlying the invention are solved by passing a beam of light horizontally through the cavities of the keyboard the interruption of which initiates in known manner an electric control impulse.

The keyboard according to the invention consists of a preferably unitary light transmitting carrier body provided with cavities to be touched by the operator. Adjacent the edges of these cavities are embedded in the carrier body photoelectric transducers, for example photo diodes, having a diaphragm mounted in front of them for the purpose of confining a control light beam.

To increase the intensity of the control light beam, the carrier body may carry or form a collective lens at that edge of the touch cavity which is disposed opposite the photo diode.

To improve the dispersion of light, the invention proposes to make the surface of the carrier body opposite the surface having the cavities thereon diffusely reflective and to make the carrier body itself of a transparent, preferably glass clear plastics material.

The carrier body may also in part be made of a diffusely light transmitting material, in part of a clear transparent material, being clear transparent preferably only in the area of the touch cavities. This is advisable in order to assure a sharply limited bundling of the control light beam.

According to another embodiment of the invention, the surface of the touch cavities may also be provided with an opaque layer, coating, or the like, and may be left transparent only in the region of the entrance and the exit of the control light beam and, if desired, of a cavity character. In this manner a further safeguard against stray light is provided and at the same time the light diffusion of the carrier body is utilized for the illumination of the characters (letters, numbers, etc.) of the individual touch cavities.

The double element construction of the touch cavities, namely with a diode 4 and a lens 8, is especially advantageous when the keyboard is used in devices which are to be operated merely by touch, for instance in a typewriter. In such a construction the light beam is arranged to pass near the bottom of the cavity and this enables the operator to establish a touch contact with the keyboard without immediately getting one of his fingertips into the region of the light beam associated with it, thus unintentionally triggering a modulation pulse. In other words, the operator may place his fingertips in the upper step or beveled portion 3*a* of the cavities and go by his sense of touch for touch-typewriting. Thereby the danger of misguided control is to a great extend eliminated.

An advantage in terms of manufacture lies also in the inventive construction of the carrier body as a simultaneous carrier of one or more holders for lamps which are to illuminate the keyboard in operation. The arrangement of the lamps according to the invention along one or more small sides of the carrier body is preferred because it is structurally favorable and makes use of the effect of the carrier body as a light conducting rod.

If an especially space saving arrangement is desired, the invention proposes to illuminate the carrier body by means of an electro-luminescent coating deposited preferably on that area of the carrier body which faces away from the keys.

According to the invention, also small deposits of electroluminescent materials on the keys opposite the photo diodes to serve as control light sources can be useful.

In the following the invention will be described in further detail with reference to the accompanying drawings in which.

Figure 1:
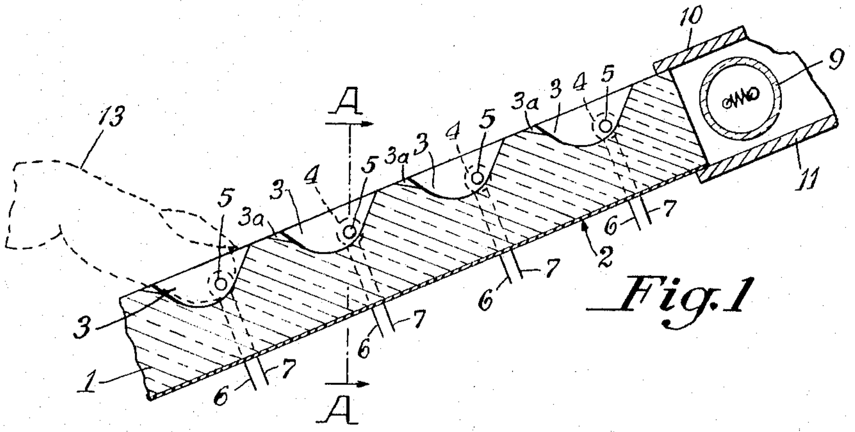
FIG. 1 illustrates a section of a keyboard according to the invention.
Figures 2, 3:
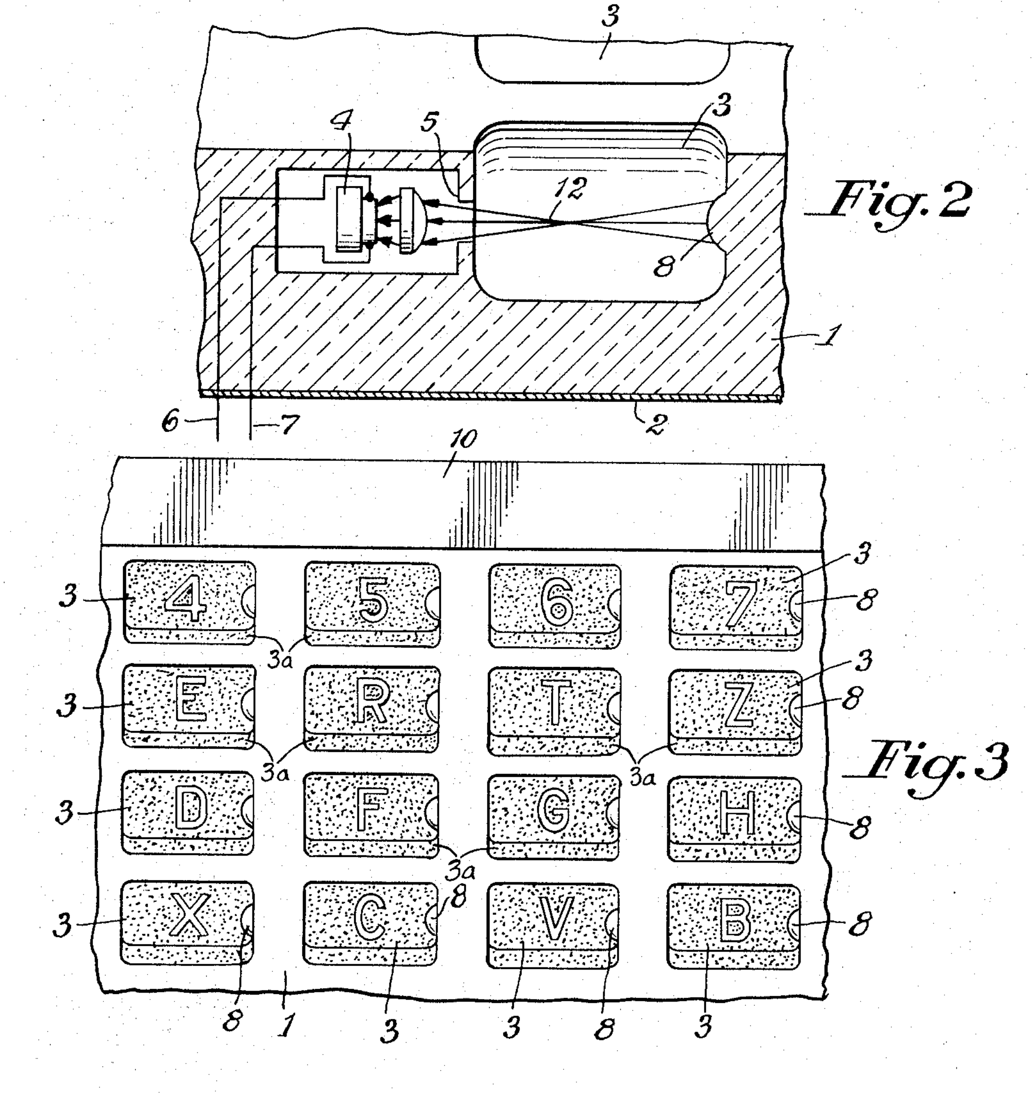
FIG. 2 is a sectional view along the line A—A of FIG. 1 in an enlarged scale.
FIG. 3 is a partial top plan view of the keyboard of the invention.

Referring to FIG. 1, into a carrier body 1 made of a glass clear plastics material and having a diffusely reflective reverse side 2 are molded dual-step touch cavities 3 arranged in spaced relation from each other and in a number of vertically spaced horizontal rows as shown in FIG. 3. Embedded in the carrier 1 at the left-hand end of each of the cavities 3 are a photo diode 4 with a diaphragm 5 mounted in front of it and electric conductors 6 and 7. In each right-hand end of the cavities 3 the carrier body 1 is provided with a portion forming a collective lens 8 located opposite the photo diode 4. The upper narrow side of the carrier body 1 is constructed as a holder for a tubular fluorescent lamp 9 which is covered toward the outside by holding plates 10 and 11.

When the device with the keyboard according to the invention is to be used, the fluorescent lamp 9 has to be switched on. The light generated by it illuminates the carrier body 1 and in part is reflected by the diffusely reflective reverse side 2. The collective lenses 8 in the lower portion of the dual-step cavities 3 collect the control light rays 12 and guide them through the apertures of the diaphragms 5 onto the receiving surfaces of the photo diodes 4. The photo diode 4 is of known construction and operates in accordance with the semi-conductor principle.

When a finger 13 of the operator is placed so far in one of the cavities 3 that it covers the photo diode 4, the light beam travelling between the collective lens 8 and the photo diode 4 is interrupted and a control impulse is initiated which is conducted by the electric conductors 6 and 7 in known manner to a control device or the like.

What we claim is:

1. An optical keyboard with immobile switches comprising a light transmitting plate, a source of light arranged on one edge of said light transmitting plate, said plate being provided in one of its faces with touch cavities, said touch cavities being arranged in spaced relation and in a number of vertically spaced horizontal rows, photoelectric transducers embedded in said plate adjacent one end of each of said cavities, each photoelectric transducer comprising a photo diode and a diaphragm in front of the same, and means forming a collective lens disposed at the other end of each of said cavities for directing a beam of light across its respective cavity and diaphragm associated therewith and onto said photoelectric transducer, said beam of light being adapted to be interrupted by a finger of the keyboard operator inserted into said cavity.

2. A keyboard according to claim 1, in which the bottom surface of said carrier body opposite the face having said cavities therein is light dispersing.

3. A keyboard according to claim 1, in which said carrier body is made in part of a diffusely light transmitting material and in part of a clear transparent material, said clear transparent material being provided only in the region of said cavities.

4. A keyboard according to claim 1, in which the face of said carrier body having the cavities therein and the surface of said cavities is provided with an opaque coating and is made light transmitting only in the region of the entrance and the exit of the light beam into and from said cavities.

5. A keyboard according to claim 1, in which said cavities are constructed to comprise two steps, whereby said light beam is arranged to pass in the lower step and a touch contact is provided at the other step outside the region of said light beam to allow a blind operation of said keyboard.

6. A keyboard according to claim 1, including an electroluminescent coating which is deposited on the bottom surface of said carrier body opposite the surface thereof which has said touch cavities therein.

References Cited

UNITED STATES PATENTS

| | | | |
|---|---|---|---|
| 2,228,780 | 1/1941 | Roberts ------------ | 197—98 X |
| 2,432,527 | 12/1947 | Lang -------------- | 197—98 X |
| 3,017,463 | 1/1962 | Dinsmore et al. ---- | 197—98 X |

OTHER REFERENCES

IBM Technical Disclosure Bulletin, article by Sharp et al. entitled, "Optical Keyboard" vol. 5, No. 10, March 1963, p. 127.

IBM Technical Disclosure Bulletin, article by Sharp entitled, "Non-Mechanical Keyboard" vol. 5, No. 12, May 1963, p. 22.

IBM Technical Disclosure Bulletin, article by Lynott entitled, "Photo Keyboard" vol. 3, No. 11, April 1961 p. 44.

ROBERT E. PULFREY, *Primary Examiner.*

E. S. BURR, *Assistant Examiner.*